UNITED STATES PATENT OFFICE.

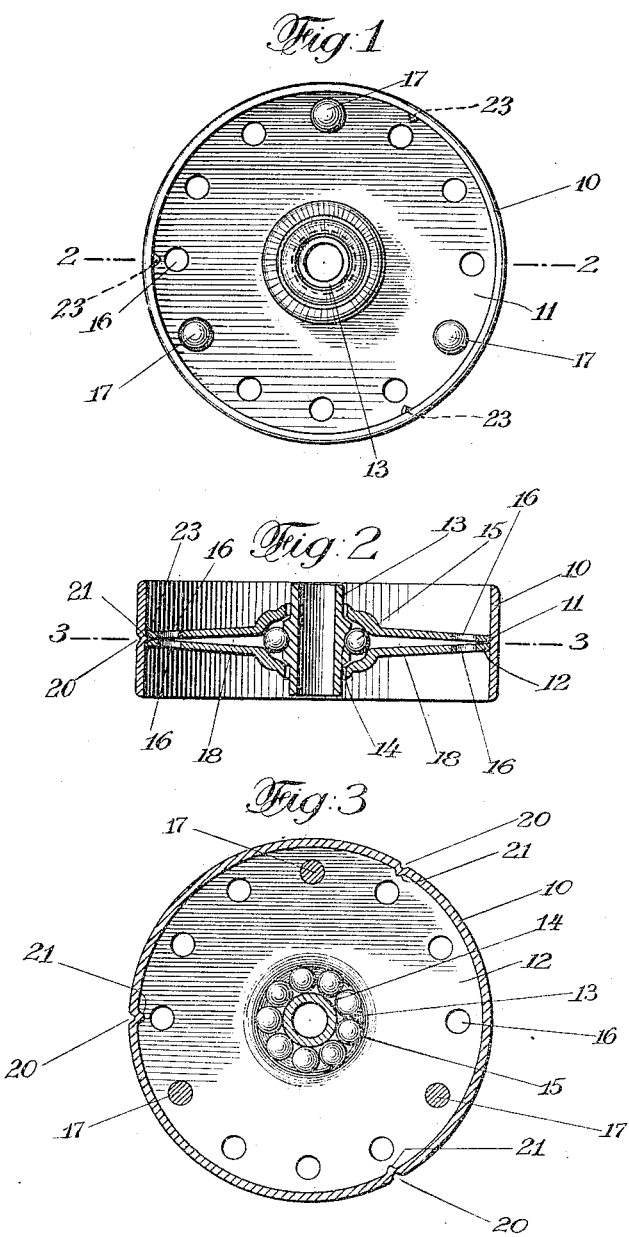

EMIL KLAHN, OF HOBOKEN, NEW JERSEY.

BALL-BEARING ROLLER.

1,212,503.  Specification of Letters Patent.  Patented Jan. 16, 1917.

Application filed January 19, 1910. Serial No. 538,835.

*To all whom it may concern:*

Be it known that I, EMIL KLAHN, a citizen of the United States, and a resident of Hoboken, in the county of Hudson and State of New Jersey, have invented certain new and useful Improvements in Ball-Bearing Rollers, of which the following is a specification.

The invention relates to wheels, and particularly to wheels for ball-bearing roller-skates.

It has for its object to provide a wheel, most of whose parts can be economically stamped from sheet metal, which shall employ one set of balls only, and in which wear can be accommodated and variations of the diameter of the wheel automatically taken up.

It has for its further object to provide a suitable lubricant chamber from which the lubricant is fed to the balls as required.

The nature of my invention will be best understood when described in connection with the accompanying drawings, in which—

Figure 1 is a plan view of the improved wheel. Fig. 2 is a vertical section taken on the line 2—2, Fig. 1. Fig. 3 is a horizontal section taken on the line 3—3, Fig. 2.

Similar characters of reference designate corresponding parts throughout the several views.

Referring now to the drawings—10 designates the rim of the wheel and may be stamped from suitable sheet metal by cupping the same and cutting away the bottom. This bottom may serve as one of the circular webs 11 or 12 of the wheel.

13 designates the sleeve, and is provided with a groove or seat 14 for the balls 15. The webs 11 and 12 are provided with a plurality of holes 16, and are fitted over the sleeve or the like 13 (as shown) to retain the balls 15 in their seat 14. These webs are riveted together at suitable points by means of rivets 17, and the co-acting faces of the same are preferably designed to form a small angle (greatly exaggerated in the drawing) with each other. This serves to provide an annular chamber 18 (greatly exaggerated in the drawing) in which suitable lubricant for the balls 15 may be retained due to capillary attraction. The said slight angle between the plates permits of the convenient adjustment of the bearing in riveting, for it is obvious that the tighter the rivets are drawn the closer will the bearing be assembled. To locate and to hold these webs 11 and 12 in position and to allow for automatically taking up any variation in diameter of the wheel, the periphery of the rim 10 is indented to form the indentations 20 at a number of points midway of its width. These indentations form corresponding projections 21, preferably conical, upon the inner face of the rim 10. Corresponding depressions 23 are preferably provided at the edges of the webs 11 and 12 to fit over and to coöperate with these conical projections 21, as well as to serve in locating and preventing lateral displacement of the said webs 11 and 12 after the same have been forced within the rim 10. In riveting the webs together, the projections 21 will spread the said webs a slight distance apart at the circumference, an initial tension being thus placed upon the said webs. Any increase in the inner diameter of the rim 10, therefore, as a result of the rolling of the wheel, will be automatically accommodated due to the spring action of the said webs which, as explained, are arranged so that their inner faces form a slight angle with each other and are held a small distance apart at the circumference by the projections 21. As the diameter increases, the projections are thereby drawn outwardly and the plates of the webs brought slightly closer together at the circumference due to the initial tension under which the webs are placed in riveting the same together.

I do not wish to restrict myself to the specific means for securing the webs together, nor to the particular form of projections shown, as it is obvious that variations in the same may be made without departing from the scope of my invention.

I claim:—

1. A wheel, comprising a rim, a web portion to support same and composed of two plates, means whereby said plates may be maintained apart substantially at the rim, a sleeve, a single set of balls arranged about said sleeve and adapted to be held in position by said plates, and means to secure the plates to each other and to draw the same together to provide the desired pressure upon said balls.

2. A wheel, comprising a rim, a web portion to support same and composed of two plates, one of which is yieldable relatively to the other, means whereby said plates may be maintained apart substantially at the rim, a sleeve, a single set of balls arranged about said sleeve and adapted to be held in position by said plates, and means to secure the plates to each other and to draw the same together to provide the desired pressure upon said balls.

3. A wheel, comprising a rim, a web portion to support same and composed of two plates held in frictional engagement therewith, means whereby said plates may be maintained apart substantially at the rim, a sleeve, a single set of balls arranged about said sleeve and adapted to be held in position by said plates, and means to secure the plates to each other and to draw the same together to provide the desired pressure upon said balls.

4. A wheel, comprising a rim, a web portion to support same and composed of two plates forming a slight angle with each other, means whereby said plates may be maintained apart substantially at the rim, a sleeve, a single set of balls arranged about said sleeve and adapted to be held in position by said plates, and means to secure the plates to each other and to draw the same together to provide the desired pressure upon said balls.

5. A wheel, comprising a rim, a web portion to support same and composed of two plates held in frictional engagement therewith, means whereby said plates may be maintained apart substantially at the rim and be held against angular displacement in the plane of the wheel, a sleeve, a single set of balls arranged about said sleeve and adapted to be held in position by said plates, and means to secure the plates to each other and to draw the same together to provide the desired pressure upon said balls.

6. A wheel, comprising: a rim having a plurality of projections extending inwardly therefrom; a sleeve; a plurality of balls arranged about the same; two webs held in frictional engagement with said rim and fitting over said sleeve to hold said balls in position, said webs supporting said rim and being provided with suitable depressions to fit over the said projections to hold the said webs a slight distance apart; and means to secure said webs to each other.

7. A wheel, comprising: a rim having a plurality of conical projections extending inwardly therefrom; a sleeve; a plurality of balls arranged about the same; two webs held in frictional engagement with said rim and fitting over said sleeve to hold said balls in position, said webs supporting said rim and being provided with suitable depressions to fit over the said conical projections to hold the said webs a slight distance apart; and means to secure said webs to each other.

8. A wheel, comprising: a rim provided with a plurality of indentations, midway of its width, forming a plurality of projections extending inwardly from said rim; a sleeve provided with a peripheral groove or seat; a plurality of balls arranged about said sleeve in said groove or seat; two webs held in frictional engagement with said rim and fitting over said sleeve to hold said balls in position, said webs supporting said rim and being provided with a plurality of registering holes, and at their circumference with a plurality of suitable depressions to fit over said projections to hold said webs a slight distance apart; and rivets passing through a number of the said registering holes of the webs to secure the said webs to each other.

9. A self-contained roller skate wheel of pressed metal, comprising a central sleeve balls adapted to run thereon and to rotatably support the wheel on said sleeve, and yieldable means maintained apart by said balls, providing with said sleeve a raceway for the balls and being under a predetermined tension to retain the same on said sleeve.

10. A self-contained roller skate wheel of pressed metal, comprising a central sleeve provided with a peripheral groove, a set of balls fitting said groove to rotatably support the wheel on said sleeve, and two yieldable web plates about said sleeve maintained apart by said balls, providing with said sleeve a raceway for the balls and being under a predetermined tension to retain the same on said sleeve.

11. A self-contained roller skate wheel of pressed metal, comprising a central sleeve provided with a peripheral groove, a set of balls fitting said groove, two web plates about said sleeve to provide with said grooved portion of the sleeve a ball race for the set of balls, a rim supported by said web plates, means whereby said plates may be maintained apart substantially at the rim, and means to secure said plates to each other and to draw the same together to provide the desired pressure upon the balls.

Signed at New York, in the county of New York and State of New York, this 17th day of Jany., A. D. 1910.

EMIL KLAHN.

Witnesses:
LAURA E. SMITH,
FRED'K F. SCHUETZ.